(12) United States Patent
Atmur

(10) Patent No.: US 7,471,055 B2
(45) Date of Patent: Dec. 30, 2008

(54) CONTROLLER, DRIVE ASSEMBLY AND HALF-BRIDGE ASSEMBLY FOR PROVIDING A VOLTAGE

(75) Inventor: Robert J. Atmur, Whittier, CA (US)

(73) Assignee: The Boeing Company, Chicago, IL (US)

( * ) Notice: Subject to any disclaimer, the term of this patent is extended or adjusted under 35 U.S.C. 154(b) by 314 days.

(21) Appl. No.: 11/079,949

(22) Filed: Mar. 15, 2005

(65) Prior Publication Data

US 2006/0208674 A1 Sep. 21, 2006

(51) Int. Cl.
*H02P 6/00* (2006.01)
(52) U.S. Cl. .................................. 318/400.01
(58) Field of Classification Search ........................ None
See application file for complete search history.

(56) References Cited

U.S. PATENT DOCUMENTS

| | | | |
|---|---|---|---|
| 5,653,859 A | 8/1997 | Shi | |
| 5,675,231 A | 10/1997 | Becerra et al. | |
| 5,917,295 A | 6/1999 | Mongeau | |
| 6,020,695 A * | 2/2000 | Kelly et al. | 318/49 |
| 6,034,494 A | 3/2000 | Kitamine et al. | |
| 6,215,261 B1 | 4/2001 | Becerra | |
| 6,236,179 B1 | 5/2001 | Lawler et al. | |
| 6,320,731 B1 | 11/2001 | Eaves et al. | |
| 6,362,592 B1 | 3/2002 | Chrappan Soldavini | |
| 6,400,107 B1 | 6/2002 | Nakatani et al. | |
| 6,424,798 B1 | 7/2002 | Kitamine | |
| 6,563,725 B2 | 5/2003 | Carsten | |
| 6,642,683 B1 | 11/2003 | Atmur | |
| 6,661,190 B1 | 12/2003 | Atmur | |

| | | | |
|---|---|---|---|
| 2004/0022073 A1 * | 2/2004 | Nielsen | 363/17 |

FOREIGN PATENT DOCUMENTS

| | | |
|---|---|---|
| JP | 402168892 A | 6/1990 |
| WO | WO 83/00851 | 3/1983 |

OTHER PUBLICATIONS

Nikolaus P. Schibli; Tung Nguyen; Alfred C. Rufer; A Three-Phase Multilevel Converter for High-Power Induction Motors; *IEEE Transactions on Power Electronics*; Sep. 1998; pp. 978-986; vol. 13, No. 5; IEEE.

M.S. Kennedy Corp.; *28 AMP, 500 Volt IGBT Plus Diode Smart Power 3-Phase Motor Drive Power Hybrid-4357*; 6 pages; available at <http://www.mskennedy.com>; Preliminary Rev. E Nov. 2001.

(Continued)

*Primary Examiner*—Renata McCloud
(74) *Attorney, Agent, or Firm*—Alston & Bird LLP

(57) ABSTRACT

A half-bridge assembly is provided, such as for use in a drive assembly of a controller for controlling a motor. The half-bridge assembly includes a first arrangement, and a first diode electrically connected in parallel with the first arrangement. The half-bridge assembly also includes a second arrangement electrically connected in series with the first arrangement, as well as a second diode electrically connected in parallel with the second arrangement. Each arrangement includes a base switching element, such as a metal-oxide semiconductor field—effect transistor (MOSFET), electrically connected in series with a supplemental switching element (e.g., MOSFET).

20 Claims, 3 Drawing Sheets

OTHER PUBLICATIONS

Christopher Bridge; *The Implication of Synchronous Rectifiers to the Design of Isolated, Single-Ended Forward Converters*; 2002; 19 pages; Texas Instruments Incorporated; Dallas, Texas.

Advanced Power Technology® Europe; *Phase Leg MOSFET Power Module*; May 2003; 3 pages; APTM20AM04F.

Advanced Power Technology® Europe; *Phase leg Series & MOSFET Power Module*; Oct. 2003; 3 pages; APTM20AM06S.

Kenneth Dierberger, Richard Redl, Leo Saro; *High-Voltage MOSFET Behavior in Soft-Switching converters: Analysis and Reliability Improvements*; Feb. 20, 2004; 13 pages; Application Note; APT99804 Rev B; Advanced Power Technology®.

Jonathan Dodge; *Latest Technology PT IGBTs vs Power MOSFETs*; Apr. 4, 2003; 6 pages; Application Note; APT0302 Rev A; Advanced Power Technology®.

Jonathan Dodge; *Power MOSFET Tutorial*; May 24, 2004; 12 pages; Application Note; APT-0403 Rev A; Advanced Power Technology®.

Serge Bontemps; *Parallel Connection of IGBT and MOSFET Power Modules*; Nov. 2004; 8 pages; Application Note; APT0405; Advanced Power Technology® Europe.

* cited by examiner

CONTROLLER, DRIVE ASSEMBLY AND HALF-BRIDGE ASSEMBLY FOR PROVIDING A VOLTAGE

FEDERALLY SPONSORED RESEARCH OR DEVELOPMENT

This invention was made with government support under contract number N00024-00-C-6103 awarded by the United States Navy. The government has certain rights in this invention.

FIELD OF THE INVENTION

The present invention relates generally to controllers, drive assemblies and half-bridge assemblies for providing a voltage and, more particularly, to controllers, drive assemblies and half-bridge assemblies for providing a high-efficiency and high-frequency voltage.

BACKGROUND OF THE INVENTION

Electrical machines are used throughout a great number of devices today, and typically consist of motors, which convert electrical energy into mechanical energy, and generators, which convert mechanical energy into electrical energy. Generally, electrical machines fall into one of three categories: polyphase synchronous machines, polyphase asynchronous (i.e., induction) machines and direct current (DC) machines. Typical machines consist of two main portions: a stationary, outside portion called a stator, and a rotating, inner portion called a rotor. The rotor of typical machines is mounted on a stiff rod, or shaft, that is supported in bearings so that the rotor is free to turn within the stator to produce mechanical energy.

In one type of synchronous machine, a permanent magnet, brushless direct current (BLDC) machine, the stator is composed of windings that are connected to a controller, and the rotor is composed of two or more permanent magnets of opposed magnetic polarity. The controller includes a driver that generates poly-phase alternating input currents to the stator windings. One conventional driver includes a series of (IGBT's) electrically connected to the phase windings of a BLDC motor. For example, for a three-phase BLDC motor, a conventional driver includes six IGBT's arranged in three half-bridges, where each half-bridge generates a drive for one phase of the motor.

As the rotor rotates within the stator, and the magnets of one polarity approach cores of the stator about which the windings are wound, and that conduct the opposed polarity, sensors signal the angular position of the rotor to the controller which, in turn, controls the alternating currents to switch the polarity of the magnetic field produced by windings of the stator. For example, a three-phase BLDC motor can have two, four or more permanent magnets with alternating magnetic polarities mounted on its rotor. The required rotating magnetic field is produced by current through the stator windings. And the three phases of the current are switched in sequence, which is dictated by the angular position of the rotor.

In many BLDC motor systems, the speed of the BLDC motor is controlled by the driver pulse modulating, such as pulse width modulating, the input voltage generated by the controller. By pulse-width-modulation (PWM) of the input voltage, the driver and, thus, the controller control the average input currents to the windings by using "on" and "off" states. During the time the input currents through the windings are increasing, the voltage supply provides constant voltage to the driver at a level at least as high as the motor voltage required for the desired speed of operation. Once the currents have reached the required levels for the desired speed of the motor, the duty ratio is changed to that required to maintain the currents at or near the required level of current.

Conventional BLDC motor systems that include a driver comprising a series of IGBT's are adequate in controlling the speed of BLDC motors at low frequencies and currents. A standard driver including six IGBT's can drive a three-phase motor (two IGBT's per phase) with a switching frequency up to approximately 20 kHz. In this regard, each IGBT can typically operate with a maximum switching frequency of approximately 20 kHz at a maximum of 50 Amps. Whereas such drivers can control the speed of BLDC motors at low frequencies, such drivers that drive higher power (e.g., greater than one horsepower) and higher voltage (e.g., greater than 200 volts) three-phase motors cannot typically switch at a frequency higher than 20 kHz when the driver comprises IGBT's.

In an attempt to overcome the limit in switching frequency of IGBT's, a driver has been developed that includes high-voltage, high-current metal-oxide semiconductor field-effect transistor (MOSFET's). This driver has a switching rate on the order of 10 ns, and on-resistance ($rds_{on}$) on the order of 0.004 Ohms. Unfortunately, the MOSFET driver experiences large switching losses. In this regard, MOSFET's used in the driver include inherent diodes (i.e., "body diodes") that are coupled between the respective MOSFET's source and drain. These body diodes operate with a forward voltage on the order of 70% of the voltage of fast recovery epitaxial diodes (FRED's) used in the driver to absorb the inductive kickback of the BLDC motor phase windings under control. What occurs, then, is a large switching loss due to the slow recovery of the body diodes, resulting in a more than 200% increase in power loss of the driver.

In an effort to reduce the switching loss in the MOSFET driver, one such driver includes MOSFET's arranged in a half-bridge, the half-bridge including FRED's in parallel and blocking diodes in series with the MOSFET's. In operation, the blocking diodes inhibit the body diodes of the MOSFET's from conducting; thereby allowing the FRED's to perform their kickback function with reduced switching loss. But as a tradeoff of realizing reduced switching loss, the MOSFET driver of this configuration experiences increased power loss in the blocking diodes when conducting. This increased power loss can account for a more than 300% increase in the total power lost in an ideal diode-less half-bridge assembly, but less heating of the MOSFET.

SUMMARY OF THE INVENTION

In light of the foregoing, various embodiments of the present invention provide an improved controller, drive assembly and half-bridge assembly for providing a voltage, such as to control a brushless direct current (BLDC) motor, where the motor includes a predetermined number of phase windings. The drive assembly of embodiments of the present invention, like that of conventional MOSFET drive assemblies including blocking diodes, reduces switching loss over other conventional drive assemblies. Advantageously, however, the drive assembly of embodiments of the present invention is capable of high-speed performance, while only experiencing an increase in total power loss on the order of 100%.

According to one aspect of the present invention, a half-bridge assembly is provided, such as for use in a drive assembly of a controller for controlling a BLDC motor. The half-bridge assembly includes a first arrangement, and a first diode electrically connected in parallel with the first arrangement.

The half-bridge assembly also includes a second arrangement electrically connected in series with the first arrangement, as well as a second diode electrically connected in parallel with the second arrangement. Each arrangement includes a base switching element, such as a metal-oxide semiconductor field—effect transistor (MOSFET), electrically connected in series with a supplemental switching element (e.g., MOSFET).

More particularly, each switching element can include a drain and a source. The base switching element of each arrangement can then be electrically connected in series with a respective supplemental switching element such that the drain of the base switching element is electrically connected to the source of the respective supplemental switching element. Further, the drain of the supplemental switching element of the first arrangement and the source of the base switching element of the second arrangement can be adapted to be electrically connected to a power supply, such as when the half-bridge assembly is adapted for use in a drive assembly of a controller for controlling a motor.

For use in a drive assembly of a controller, the drive assembly can be in electrical communication with the power supply and the motor. The drive assembly can be capable of receiving a voltage output of the power supply, and capable of providing a pulse-width-modulated input voltage to the motor. The drive assembly can include a plurality of half-bridge assemblies at least one of which is electrically connected to each phase winding of the motor.

According to other aspects of the present invention, a controller for controlling a motor, and a drive assembly for providing a voltage, are given.

BRIEF DESCRIPTION OF THE DRAWINGS

Figure 1:
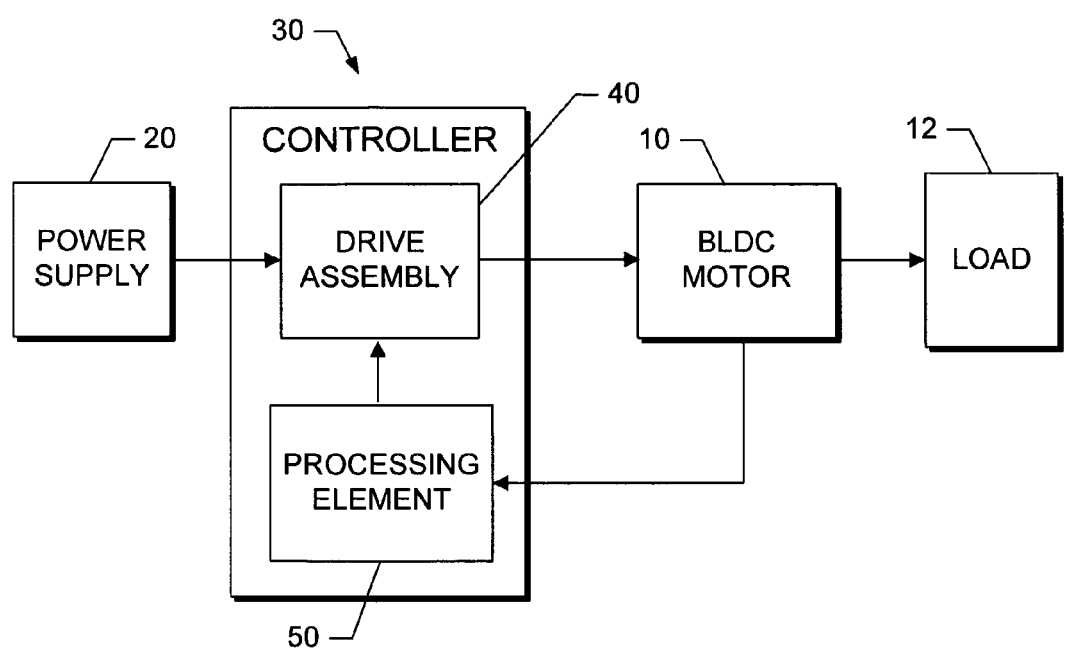
Figure 2:
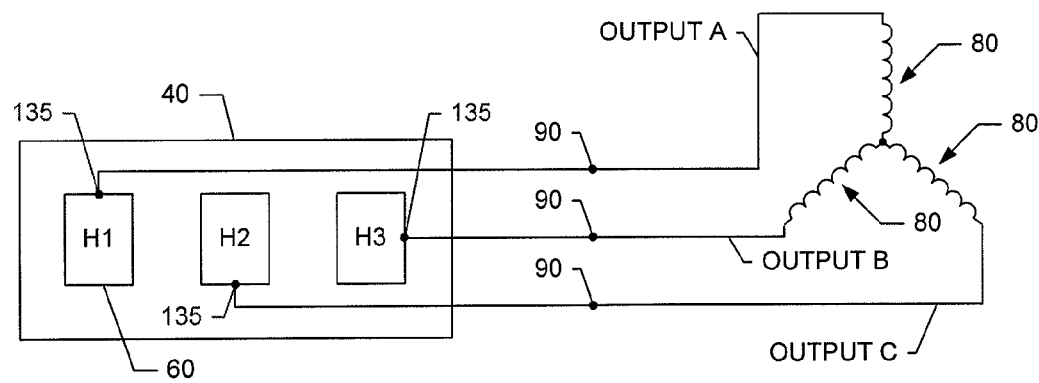
Figure 3:
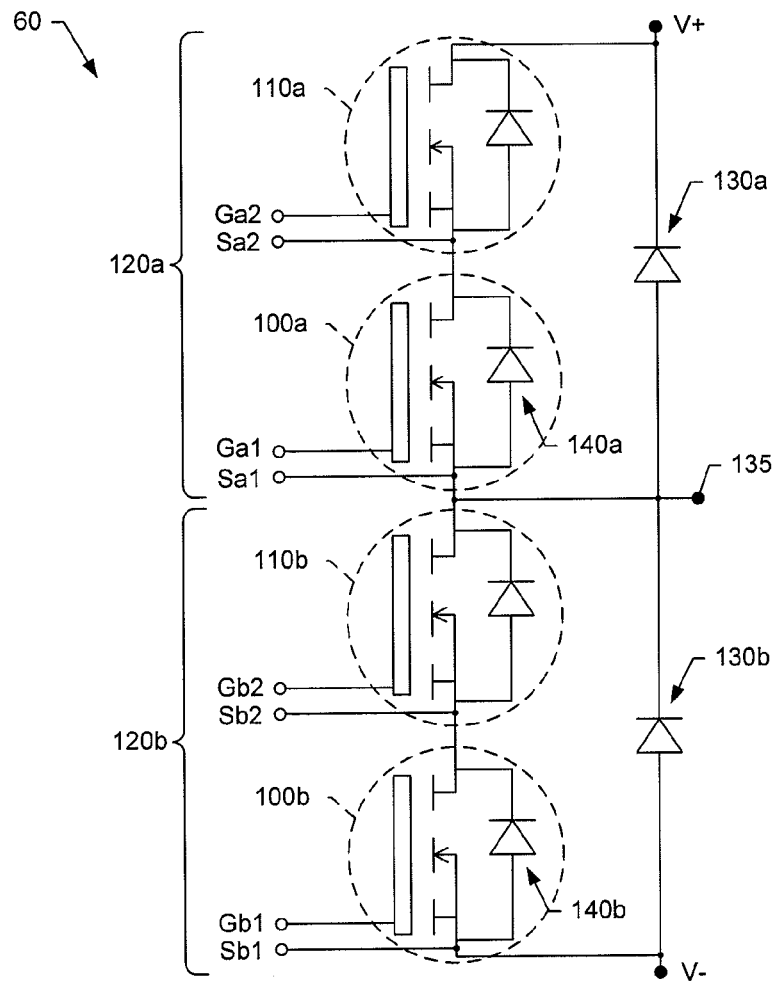
Figure 4A:
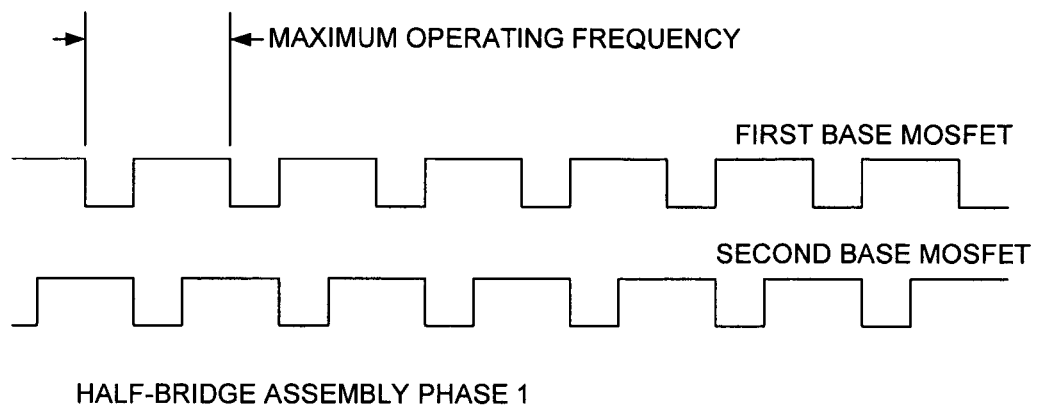
Figure 4B:
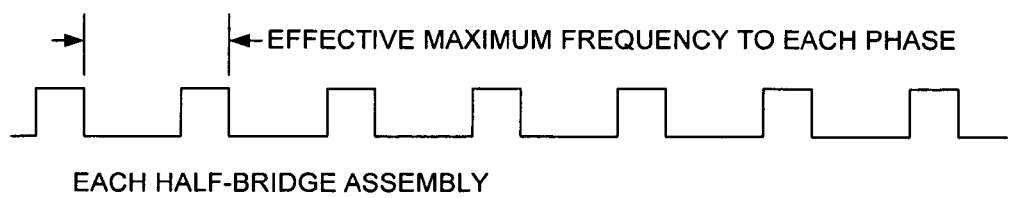

Having thus described the invention in general terms, reference will now be made to the accompanying drawings, which are not necessarily drawn to scale, and wherein:

FIG. 1 is a block diagram of a system for providing a voltage to control a brushless direct current (BLDC) motor according to one embodiment of the present invention;

FIG. 2 is a schematic diagram of the drive assembly and BLDC motor according to one embodiment of the present invention;

FIG. 3 is a schematic diagram of the drive assembly further highlighting half-bridge assemblies of the drive assembly, according to one embodiment of the present invention;

FIG. 4a is a timing diagram of each base MOSFET of one half-bridge assembly of a drive assembly of one embodiment of the present invention, where the half-bridge assembly is electrically connected to a respective phase winding of the BLDC motor; and FIG. 4b is a timing diagram collectively illustrating the base MOSFET's of FIG. 4a, in accordance with one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, one type of system and drive assembly that would benefit from embodiments of the present invention is shown. The system and drive assembly will be primarily described in conjunction with motor control applications. It should be understood, however, that the system and drive assembly can be utilized in conjunction with a variety of other applications, both in the motor control industries and outside of the motor control industries. For example, the system and drive assembly of embodiments of the present invention can be utilized in conjunction with any of a number of different power supply applications.

As shown, a system is provided for providing a voltage, such as to control a BLDC motor 10. As described below, the BLDC motor is a three-phase BLDC motor including three phase windings, but it should be understood that the motor can comprise a BLDC motor including any of a number of different phases and, thus, phase windings, without departing from the spirit and scope of the present invention. According to one embodiment, the system includes a power supply 20 and a controller 30. And, as illustrated, the BLDC motor is preferably connected to a load 12, to which the mechanical energy generated by the motor is transferred.

The power supply 20 is typically a direct current (DC) power supply, however, it should be understood that the power supply can alternatively be an alternating current (AC) power supply with an additional voltage converter included within the system, as described below. The controller 30 is in electrical communication with the power supply and the BLDC motor 10, and includes a drive assembly 40 and one or more processing elements 50. The processing element(s) of the controller, such as a personal computer or other high level processor, is in electrical communication with the drive assembly and the power supply. In this regard, the processing element(s) performs conventional motion control system controller functions, as such are known, including controlling operation of the drive assembly.

The drive assembly 40 is in electrical communication with the power supply 20 and the motor 10. The drive assembly generally receives the voltage output from the power supply and provides a pulse-width modulated (PWM) input voltage to the motor in accordance with a predetermined relationship between the average current output and the PWM input voltage, as such is known. To provide proper PWM input to the motor, the processing element(s) 50 typically receives commutation feedback from the motor consisting of rotor magnetic field orientation information obtained from such devices as magnetic field sensors (e.g., Hall Effect Sensors) or position sensors (e.g., encoders or resolvers).

As shown more distinctly in FIGS. 2 and 3, the drive assembly 40 comprises a plurality of half-bridge assemblies 60. As shown, each half-bridge assembly is electrically connected to a respective phase winding 80 of the BLDC motor 10. In this regard, each half-bridge assembly can be electrically connected to a respective output node 90 that is electrically connected to a different phase winding of the BLDC motor. The drive assembly thus contains the same number of half-bridge assemblies as the number of phase windings of the BLDC motor. Thus, as shown, for a three-phase motor, the drive assembly includes three half-bridge assemblies (designated H1, H2 and H3). As such, the drive assembly is capable of providing a PWM output (illustrated as outputs A, B and C) to the phase windings of the BLDC motor.

Each half-bridge assembly 60 includes first and second base switching elements such as two power field-effect transistors (FET), or more particularly, first and second metal-oxide semiconductor FET's (MOSFET's) 100a, 100b. The first and second base MOSFET's are electrically connected in series with first and second supplemental switching elements, respectively, where the supplemental switching elements may also comprise MOSFET's 110a, 110b. More particularly, in the illustrated embodiment, the drain of each base MOSFET is electrically connected to the source of a respective supplemental MOSFET. The first and second base and supplemental MOSFET pairs form first and second MOSFET arrangements 120a, 120b, respectively. The first and second MOSFET arrangements, in turn, are electrically connected in parallel with first and second diodes, such as first and second fast recovery epitaxial diodes (FRED's) 130a, 130b, respectively.

As shown, the drain of the first supplemental MOSFET 110a of the first MOSFET arrangement 120a and source of the second base MOSFET 100b of the second MOSFET arrangement 120b are electrically connected to the power supply 20. Also, a node 135 is connected between the first and second MOSFET arrangements, and thus the first and second FRED's 130a, 130b. Node 135, then, is electrically connected to a respective output node 90. In addition, the gates (Ga1, Gb1) and sources (Sa1, Sb1) of the first and second base MOSFET's 100a, 100b are electrically connected to a processing element 50. Similarly, the gates (Ga2, Gb2) and sources (Sa2, Sb2) of the first and second supplemental MOSFET's 110a, 110b are electrically connected to the same or a different processing element. Further, although not shown, one or more of the half-bridge assemblies 60 can further include any one of a number of other electrical components, without departing from the spirit and scope of the present invention.

FIG. 4a illustrates a timing diagram of each base MOSFET 100a, 100b of a half-bridge assembly 60 connected to a respective phase winding 80 of a three-phase BLDC motor 10 operating at the maximum frequency of the base MOSFET's. As illustrated, the first and second base MOSFET's are switched in the "on" and "off" states during the same frequency period, with the second base MOSFET switched in a staggered manner with respect to the first base MOSFET, as is known. Thus, as shown in FIG. 4b, then, each half-bridge assembly is capable of providing a PWM output to one phase winding of the BLDC motor at any frequency that does not exceed an effective maximum frequency equal to the maximum frequency of each base MOSFET.

As explained in the background section, in conventional MOSFET drive assemblies, the body diodes 140a, 140b in the base MOSFET's 100a, 100b, respectively, operate with a forward voltage on the order of 70% of the voltage of FRED's 130a, 130b used to absorb the inductive kickback of the respective phase winding 80 of the BLDC motor 10. As such, these conventional MOSFET drive assemblies suffer from a large switching loss due to the slow recovery of the body diodes, resulting in a more than 200% increase in power loss of the drive assembly. To overcome the large switching loss, another conventional MOSFET drive assembly further includes blocking diodes in series with the base MOSFET's. In this MOSFET drive assembly, the blocking diodes inhibit the body diodes of the base MOSFET's from conducting; thereby allowing the FRED's to perform their kickback function with reduced switching loss. However, while this MOSFET drive assembly configuration reduces switching loss, it experiences increased power loss in the blocking diodes when conducting. This increased power loss can account for a more than 300% increase in the total power lost in an ideal diodeless half-bridge assembly, but less heating of the MOSFET.

By including the supplemental MOSFET's 110a, 110b in series with the base MOSFET's 100a, 100b, the drive assembly 60 of embodiments of the present invention increases the forward voltage of the body diodes 140a, 140b above (>100%) the voltage of the FRED's 130a, 130b. The drive assembly of embodiments of the present invention, like that of conventional MOSFET drive assemblies including blocking diodes, reduces switching loss over other conventional drive assemblies. Advantageously, however, the drive assembly of embodiments of the present invention is capable of high-speed performance, while only experiencing an increase in total power loss on the order of 100% (cf. the 300% total power loss increase of the conventional drive assembly with blocking diodes). In addition, the drive assembly configuration of embodiments of the present invention results in the additional power loss being equally divided between the base and supplemental MOSFET's, thereby permitting the drive assembly to operate without a significantly increased thermal load.

It should be noted that FIG. 2 is merely illustrative of one type of drive assembly including a plurality of half-bridge assemblies, in accordance with one embodiment of the present invention. A number of alternative drive assemblies are capable of being configured in accordance with other embodiments of the present invention. For example, the drive assembly can include a plurality of half-bridge assemblies arranged in n groupings of half-bridge assemblies that are electrically connected to each phase winding 80 of the BLDC motor 10. In such a configuration, each half-bridge assembly in a grouping can be electrically connected to a respective output node 90 that is electrically connected to a different phase winding of the BLDC motor. Each grouping thus contains the same number of half-bridge assemblies as the number of phase windings of the BLDC motor. Thus, as shown, for a three-phase motor, each grouping includes three half-bridge assemblies. The groupings of half-bridge assemblies can then be operated in any of a number of different manners to effectuate operation of the system. For more information on such configurations, see U.S. Pat. No. 6,642,683, entitled: Controller and Associated Drive Assembly for Power Sharing, Time Sliced Control of a Brushless Direct Current Motor, issued Nov. 4, 2003; and U.S. Pat. No. 6,661,190, entitled: Controller and Associated Drive Assembly Controlling a Brushless Direct Current Motor, issued Dec. 9, 2003, the contents of both of which are hereby incorporated by reference in their entireties.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A controller for controlling a motor, wherein the motor includes a predetermined number of phase windings, the controller comprising:

a drive assembly in electrical communication with a power supply and the motor, wherein the drive assembly is configured to receive a voltage output of the power supply and provide a pulse-width-modulated input voltage to the motor, wherein the drive assembly comprises a plurality of half-bridge assemblies at least one of which is configured to electrically connect to each phase winding of the motor, at least one half-bridge assembly comprising:

a first arrangement;

a first diode electrically connected in parallel with the first arrangement;

a second arrangement electrically connected in series with the first arrangement; and a second diode electrically connected in parallel with the second arrangement, wherein each arrangement includes a base switching element electrically connected in series with a supplemental switching element, and wherein the at least one half-bridge assembly is configured to electrically connect to a respective phase winding of the motor at a node electrically connected in series with and between the first and second diodes; and a processing element in electrical communication with the drive assembly and the motor, wherein the processing element is configured to control operation of the drive assembly.

2. A controller according to claim 1, wherein the base switching elements comprise metal-oxide semiconductor field-effect transistors (MOSFET's).

3. A controller according to claim 2, wherein the supplemental switching elements comprise MOSFET's.

4. A controller according to claim 1, wherein each switching element includes a drain and a source, and wherein the base switching element of each arrangement is electrically connected in series with a respective supplemental switching element, the drain of the base switching element being electrically connected to the source of the respective supplemental switching element.

5. A controller according to claim 1, wherein each switching element includes a drain and a source, and wherein the drain of the supplemental switching element of the first arrangement and the source of the base switching element of the second arrangement are adapted to be electrically connected to a power supply.

6. A drive assembly for providing a voltage, wherein the drive assembly comprises a plurality of half-bridge assemblies, at least one half-bridge assembly comprising:

a pair of base switching elements;

a pair of supplemental switching elements electrically connected in alternating series with the pair of base switching elements; and a pair of diodes, each diode electrically connected in parallel with a respective base switching element in series with a supplemental switching element, wherein the drive assembly is configured to electrically connect to a load at a node electrically connected in series with and between the pair of diodes.

7. A drive assembly according to claim 6 adapted to provide a pulse-width-modulated input voltage to a motor that includes a predetermined number of phase windings, wherein at least one half-bridge assembly is electrically connected to each phase winding of the motor.

8. A drive assembly according to claim 6, wherein the base switching elements comprise metal-oxide semiconductor field-effect transistors (MOSFET's).

9. A drive assembly according to claim 8, wherein the supplemental switching elements comprise MOSFET's.

10. A drive assembly according to claim 6, wherein each switching element includes a drain and a source, and wherein each base switching element is electrically connected in series with a respective supplemental switching element, the drain of the base switching element being electrically connected to the source of the respective supplemental switching element.

11. A drive assembly according to claim 6, wherein the pairs of base and supplemental switching elements comprise a first supplemental switching element electrically connected in series with a first base switching element, the first base switching element being electrically connected in series with a second supplemental switching element, and the second supplemental switching element being electrically connected in series with a second base switching element.

12. A drive assembly according to claim 11, wherein each switching element includes a drain and a source, and wherein the drain of the first supplemental switching element and the source of the second base switching element are adapted to be electrically connected to a power supply.

13. A half-bridge assembly comprising:

a first arrangement;

a first diode electrically connected in parallel with the first arrangement;

a second arrangement electrically connected in series with the first arrangement; and a second diode electrically connected in parallel with the second arrangement, wherein each arrangement includes a base switching element electrically connected in series with a supplemental switching element, and wherein the half-bridge assembly is configured to electrically connect to a load at a node electrically connected in series with and between the first and second diodes.

14. A half-bridge assembly according to claim 13, wherein the base switching elements comprise metal-oxide semiconductor field-effect transistors (MOSFET's).

15. A half-bridge assembly according to claim 14, wherein the supplemental switching elements comprise MOSFET's.

16. A half-bridge assembly according to claim 13, wherein each switching element includes a drain and a source, and wherein the base switching element of each arrangement is electrically connected in series with a respective supplemental switching element, the drain of the base switching element being electrically connected to the source of the respective supplemental switching element.

17. A half-bridge assembly according to claim 13, wherein each switching element includes a drain and a source, and wherein the drain of the supplemental switching element of the first arrangement and the source of the base switching element of the second arrangement are adapted to be electrically connected to a power supply.

18. A controller according to claim 1, wherein for each arrangement, the processing element is configured to switch the base switching element and supplemental switching element on and off together.

19. A drive assembly according to claim 6, wherein each base switching element and an adjacent supplemental switching element are switchable on and off together to thereby at least partially drive a load when the drive assembly is connected to the load.

20. A half-bridge assembly according to claim 13, wherein for each arrangement, the base switching element and supplemental switching element are switchable on and off together to thereby at least partially drive a load when the half-bridge assembly is connected to the load.

* * * * *